United States Patent
Burman et al.

(10) Patent No.: US 10,171,327 B2
(45) Date of Patent: Jan. 1, 2019

(54) HANDLING OF NETWORK CHARACTERISTICS

(71) Applicant: Telefonaktiebolaget LM Ericsson (publ), Stockholm (SE)

(72) Inventors: Bo Burman, Upplands Väsby (SE); Göran Eriksson, Norrtälje (SE); Magnus Westerlund, Upplands Väsby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 206 days.

(21) Appl. No.: 15/034,399

(22) PCT Filed: Nov. 8, 2013

(86) PCT No.: PCT/SE2013/051319
§ 371 (c)(1),
(2) Date: May 4, 2016

(87) PCT Pub. No.: WO2015/069163
PCT Pub. Date: May 14, 2015

(65) Prior Publication Data
US 2016/0277274 A1    Sep. 22, 2016

(51) Int. Cl.
*H04L 12/26* (2006.01)
*H04L 12/24* (2006.01)
(Continued)

(52) U.S. Cl.
CPC ...... *H04L 43/0876* (2013.01); *H04L 12/1868* (2013.01); *H04L 41/0896* (2013.01); *H04N 21/2402* (2013.01)

(58) Field of Classification Search
CPC ....... H04L 47/25; H04L 65/60; H04L 65/605; H04L 65/80; H04L 12/1868;
(Continued)

(56) References Cited

U.S. PATENT DOCUMENTS 9,131,408 B1 * 9/2015 Falsafi ................. H04W 48/18
2004/0264501 A1   12/2004 Zalitzky et al.
(Continued)

FOREIGN PATENT DOCUMENTS

EP    2 192 731 A1    6/2010

OTHER PUBLICATIONS

International Search Report and Written Opinion of the International Searching Authority, Application No. PCT/SE2013/051319, dated Jun. 24, 2014.
(Continued)

*Primary Examiner* — Harun Chowdhury
(74) *Attorney, Agent, or Firm* — Sage Patent Group

(57) ABSTRACT

There is provided a network information system for handling network characteristics. The network information system comprises a first functional module, a second functional module, and a third functional module. The third functional module is arranged to invoke handling of network characteristics by triggering operation of the first functional module and the second functional module. An available bitrate for a media flow is estimated. Information about a permitted share of physical resources to be used during the transmission of the media flow is acquired. The estimated available bitrate for the media flow is updated. The updated estimated available bitrate is provided to a network entity associated with transmission of the media flow.

23 Claims, 4 Drawing Sheets

(51) Int. Cl.
*H04N 21/24* (2011.01)
*H04L 12/18* (2006.01)

(58) Field of Classification Search
CPC ........... H04L 41/0896; H04L 43/0876; H04W 28/20; H04W 48/18; H04W 72/085; H04N 21/2402
USPC ...................... 370/230, 253, 329, 230.1, 235
See application file for complete search history.

(56) References Cited

U.S. PATENT DOCUMENTS

| | | |
|---|---|---|
| 2007/0081459 A1 | 4/2007 | Segel et al. |
| 2014/0071889 A1* | 3/2014 | Aksu ................ H04L 65/40 370/328 |
| 2014/0250231 A1* | 9/2014 | Gouache ............ H04L 65/80 709/226 |
| 2015/0103763 A1* | 4/2015 | Jung ................ H04W 72/085 370/329 |
| 2015/0195208 A1* | 7/2015 | Ozawa ............... H04L 47/25 370/230 |
| 2016/0057192 A1* | 2/2016 | Delaunay ........... H04L 65/605 709/219 |

OTHER PUBLICATIONS

3GPP, Technical Specification—"3rd Generation Partnership Project; Technical Specification Group Services and System Aspects; IP Multimedia Subsystem (IMS); Multimedia Telephony; Media handling and interaction (Release 12)", 3GPP TS 26.114 V12.3.0 (Sep. 2013), 280 pp.

\* cited by examiner

HANDLING OF NETWORK CHARACTERISTICS

CROSS REFERENCE TO RELATED APPLICATION

This application is a 35 U.S.C. § 371 national stage application of PCT International Application No. PCT/SE2013/051319, filed on Nov. 8, 2013, the disclosure and content of which is incorporated by reference herein in its entirety. The above-referenced PCT International Application was published in the English language as International Publication No. WO 2015/069163 A1 on May 14, 2015.

TECHNICAL FIELD

Embodiments presented herein relate to network characteristics, and particularly to a method, a network information system, a computer program, and a computer program product for handling network characteristics

BACKGROUND

In mobile communication networks, there is always a challenge to obtain good performance and capacity for a given communications protocol, its parameters and the physical environment in which the mobile communication network is deployed.

Existing real-time audio-visual communication services, including the 3GPP (3rd Generation Partnership Project) technical standard TS 26.114 (MTSI; Multimedia Telephony Service for Internet Protocol Multimedia Subsystem) and the profile called IR.94 in GSMA (the Global System for Mobile Communications Association), use SIP/SDP (Session Initiation Protocol/Session Description Protocol) as signaling to configure and setup a call between two user equipment (UE), and use the Internet Protocol (IP), the User Datagram Protocol (UDP) and the Real-time Transport Protocol (RTP) to encapsulate a (compressed representation of) media data during transport, on top of any chosen physical transport medium.

SDP (and extensions to SDP) defines bitrate parameters, applicable per media or for the entire media aggregate included in a session. SDP is typically sent once during session setup, and occasionally also mid-session. The IMS system uses information from the SDP to map different media streams to different quality radio bearers, where the quality is typically parameterized into a set of parameters that does not include bitrate, but instead uses information from SDP and pre-configured rules to establish a maximum bitrate limit, a minimum guaranteed bitrate limit and possibly also a minimum bitrate limit.

The RTP control protocol (RTCP) is typically used to convey information from media receiver to media sender (e.g., from one UE to another UE or from a media server to a UE) of transport characteristics, like bitrate, loss and delay as seen by the media receiver. A temporary shortage of available transport bitrate compared to what bitrate was produced at the media sender typically impacts other media characteristics listed in the RTCP, which can then be used by the media sender to both detect that there is a shortage and, more or less accurately, dynamically estimate the magnitude of this shortage.

As a complement to the above, there is also an RTCP extension, defined in Codec Control Messages (CCM), which allows a media receiver's opinion of a maximum bitrate to be explicitly communicated to the media sender in a TMMBR (Temporary Maximum Media Stream Bit Rate Request) message. This allows the media receiver to communicate its' opinion of the magnitude of the bitrate shortage to the media sender.

Media senders that are able to impact the produced media bitrate in 3GPP MTSI and VoLTE (Voice over Long Term Evolutional) are mainly the UE, but may also include network nodes in other parts of the network, such as for example, the Media Resource Function Processor (MRFP) or Session Border Gateways (SBG).

The bitrate parameter exchanged in SDP for a specific session only establishes a maximum allowable bitrate that a media sender can use. In some cases, when the media sender also has information about radio layer signaling, it may know the guaranteed minimum bitrate lower limit, if such limit exists (may be 0). This minimum bitrate is however not guaranteed at all times, but only to a certain level of significance. Even in the best case, there are thus only a minimum and a maximum limit and actually available bitrate at a certain point in time may be anywhere between those values.

For the case of RTCP information, it may be desirable to limit the network resources taken by the transmission of RTCP transport characteristics observations, since it may be preferred to put as much resources as possible to the (RTP) media itself. Therefore, the media receiver may aggregate data for some time and report a summary valid for some period of time, creating both a delay in conveying the information and a loss of accuracy due to the aggregation.

Since the reported RTCP data is based on observations of the received media rather than actual first-hand network resource information, information accuracy on network resources is lost also in this step. The media characteristics that can be observed at the receiver include both local media sender choices and actions impacting media transmission as well as characteristics caused by the actual transport channel. Typically, the media receiver is not aware of what parts of the characteristics that were present as a more or less conscious choice already at the sender, and what parts that were impacted by the transport. Some media sender characteristics information is available in RTCP messages sent from the media sender to the media receiver, but information therein may not be enough to exactly know what was caused by the transport and what was not.

Regarding the explicit maximum bitrate value in the TMMBR message, the information source of that value is left open in the specification. If the information elements used to set the TMMBR bitrate are exactly the same as sent in the RTCP messages, it may be possible that the receiver of those RTCP messages is able to arrive at the same TMMBR bitrate, and sending TMMBR thus becomes redundant.

In conclusion, the above disclosed methods to estimate available bitrate makes it hard to accurately match actually available bitrate resources to the produced bitrate at the media sender, leading to bad QoE, such as for example one or more of lower-than-necessary media quality due to under-utilization of available bitrate resources, loss of media data due to over-use of bitrate resources, delay and delay variation due to (long or short-term) over-use of bitrate resources.

Thus, accurate and timely bitrate information is not available from the two currently available sources; SDP or RTCP feedback.

Hence, there is still a need for improved bitrate information in communication networks.

SUMMARY

An object of embodiments herein is to provide improved bitrate information in communication networks.

The inventors of the enclosed embodiments have through a combination of practical experimentation and theoretical derivation discovered that more accurate information about available bitrate would be needed by any media sender that can control the produced bitrate. This "media sender" may or may not be the original source of the media.

According to a first aspect there is presented a network information system for handling network characteristics. The network information system comprises a first functional module. The first functional module is arranged to estimate an available bitrate for a media flow. The available bitrate is estimated based on available physical resources of a network node for the transmission of the media flow. The network information system comprises a second functional module. The second functional module is arranged to acquire information about a permitted share of physical resources to be used during the transmission of the media flow. The second functional module is arranged to update the estimated available bitrate for the media flow by matching the information to the estimated available bitrate for the media flow. The second functional module is arranged to provide the updated estimated available bitrate to a network entity associated with transmission of the media flow. The network information system comprises a third functional module. The third functional module is arranged to invoke handling of network characteristics by triggering operation of the first functional module and the second functional module.

Advantageously this provides improved bitrate information in communication networks.

Advantageously this enables access to more accurate knowledge about actual network characteristics for at least one network node.

In turn, this advantageously enables more accurate indication to a user equipment (UE) served by the network node regarding, for example, what type and quality of multimedia call that is possible at any point in time, or alternatively, when preparing to make such a call.

Advantageously, this also enables more accurate indication of network characteristics for an end-to-end resource for a specific intended recipient of the call.

Advantageously, more accurate use of initial transmission bitrate from a UE when starting a multimedia call may reduce the risk for resource over-use (with accompanying reduction in risk for perceiving bad quality), potentially impacting both the local UE (i.e., served by the network node) and other UEs sharing the same resource (for example the radio resources in a certain radio cell).

The bitrate may, for example, be applicable for local access, for remote access, or for the end-to-end path of a communications session. The bitrate may, for example, represent the transmission bitrate from a UE at any point in time during the call, and hence not only initially.

This advantageously enables a possibility for a network owner (or operator) to accurately orchestrate bitrate resources in individual cells and to individual users based on rules and policies that the network owner (or operator) is able to control.

This advantageously enables a possibility to establish agreements on bitrate policies and rules between different network owners (or operators), impacting UE and users in other networks of other network owners (or operators).

This advantageously enables a possibility for a network owner to protect the network and avoid rules and policies to break by enforcing such bitrate policies/rules by policing, whenever a UE is not conformant.

Advantageously, the NIS may be implemented in an Internet Protocol Multimedia Subsystem (IMS) with minor or no impact on existing network nodes.

According to a second aspect there is presented a method for handling network characteristics. The method is performed by a network information system. The method comprises acquiring an indication to invoke handling of network characteristics. The method comprises estimating an available bitrate for a media flow, wherein the available bitrate is estimated based on available physical resources of a network node for the transmission of the media flow. The method comprises acquiring information about a permitted share of physical resources to be used during the transmission of the media flow. The method comprises updating the estimated available bitrate for the media flow by matching the information to the estimated available bitrate for the media flow. The method comprises providing the updated estimated available bitrate to a network entity associated with transmission of the media flow.

According to a third aspect there is presented a computer program for handling network characteristics, the computer program comprising computer program code which, when run on a network information system, causes the network information system to perform a method according to the second aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
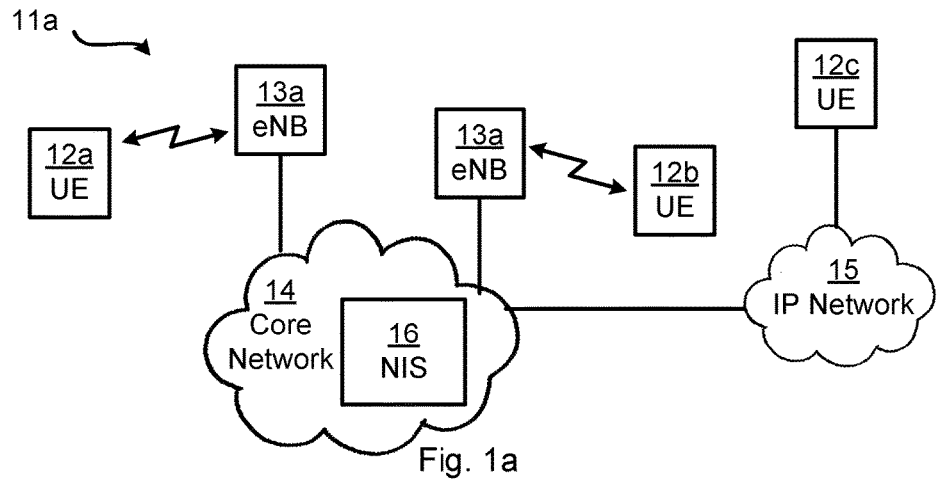
FIGS. 1a and 1b are schematic diagrams illustrating communication networks according to embodiments.

FIG. 1*a* shows a schematic overview of an exemplifying communications network 11*a* where embodiments presented herein can be applied. The communications network 11*a* comprises at least one network node (NN) in the form of an evolved Node B (eNB) 13*a*, 13*b*, each network node providing network coverage over a cell (not shown). A user equipment (UE) 12*a*, 12*b*, positioned in a particular cell is thus provided network service by the network node 13*a*, 13*b* serving that particular cell. As the skilled person understands, the communications network 11*a* may comprise a plurality of network nodes and a plurality of UEs 12*a*, 12*b* operatively connected to at least one of the plurality of network nodes. Each network node is operatively connected to a core network 14. The core network 14 comprises a network information system 16, which will be further disclosed below. The core network 14 may provide services and data to the UE 12*a*, 12*b* operatively connected to the network nodes from an external Internet Protocol (IP) packet switched data network 15. At least parts of the communications network 11*a* may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), WiFi, microwave radio links, HSPA (High Speed Packet Access), etc., as long as the principles described hereinafter are applicable.

A UE 12*c* may further have a wired connection to the external IP packet switched data network 15. Examples of UEs 12*a*, 12*b*, 12*c* include, but are not limited to end-user equipment such as mobile phones, tablet computers, laptop computers, and stationary computers. In general terms, a UE 12*a*, 12*b*, 12*c* as herein disclosed may have either a wireless connection, or a wired connection, or both a wireless connection and a wired connection to the IP packet switched network 15. Hence the communications network 11*a* may comprise any combinations of purely wirelessly connected UEs 12*a*, 12*b*, purely wired connected UEs 12*b*, and UEs 12*a*, 12*b*, 12*c* with both wireless and wired connections.

Figure 1B:
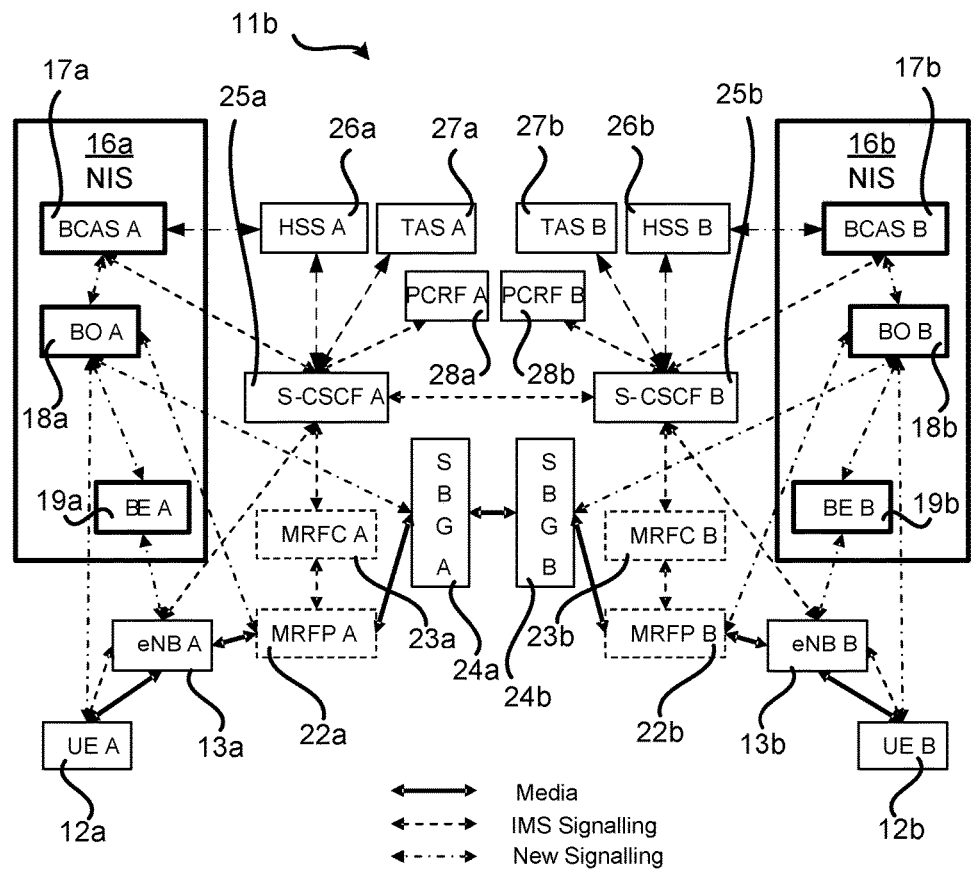

FIG. 1*b* shows a schematic overview of an exemplifying communications network 11*b* where embodiments presented herein can be applied. The communications network 11*b* comprises a first NIS 16*a* and a second NIS 16*b*. Each NIS 16*a*, 16*b* comprises a bitrate estimator (BE) module 19*a*, 19*b*, a bitrate orchestrator (BO) module 18*a*, 18*b*, and a bitrate control application server (BCAS) module 17*a*, 17*b*. Each module may be physically separate or co-located with another module.

The communications network 11*b* further comprises a Policy and Charging Rules Function (PCRF) 28*a*, 28*b*. In general terms, the PCRF is the network node designated in real-time to determine policy rules in the multimedia network.

The communications network 11*b* further comprises a telecom application server (TAS) 27*a*, 27*b*. The TAS may be either a software framework that provides a generalized approach to creating an application-server implementation, without regard to what the application functions are, or the server portion of a specific implementation instance. In either case, the function of the TAS is dedicated to the efficient execution of procedures (programs, routines, scripts) for supporting its applied applications.

The communications network 11*b* further comprises a Home Subscriber Server (HSS) 26*a*, 26*b*, or User Profile Server Function (UPSF). The HSS is a master user database that supports the IMS network entities that actually handle calls. In general terms, it comprises subscription-related information (subscriber profiles), performs authentication and authorization of the user, and can provide information about the subscriber's location and IP information.

The communications network 11*b* further comprises a Serving Call Session Control Function (S-CSCF) 25*a*, 25*b*. The S-CSCF is the central node of the signalling plane. It is a SIP (session Initiation Protocol) server, but performs session control too. It is located in the home network of the user, i.e. in the network of the operator of the user. It uses Diameter Cx and Dx interfaces to the HSS to download user profiles and upload user-to-S-CSCF associations (the user profile is only cached locally for processing reasons only and is not changed). All necessary subscriber profile information may be loaded from the HSS.

The communications network 11*b* further comprises a Media Resource Function Processor (MRFP) 22*a*, 22*b*. The MRFP is a media plane node used to mix, source or process media streams. It can also manage access right to shared resources.

The communications network 11*b* further comprises a Media Resource Function Controller (MRFC) 23*a*, 23*b*. The MRFC is a signalling plane node that interprets information coming from a TAS and S-CSCF to control the MRFP.

The communications network 11*b* further comprises a Session Border Gateway (SBG) 24*a*, 24*b*. The SBG handles signaling and media control.

As the skilled person understands, although the above node names are taken from LTE, the herein disclosed inventive concepts are equally applicable to non-LTE communications systems, mutatis mutandis. That FIG. 1*b* includes two communicating entities at each end of the network, such as UE A 12*a* and UE B 12*b*, is meant to illustrate that there may be an originating side and a terminating side for any communications in the communications network, which sides for clarity are both depicted as separate instances.

The enclosed embodiments relate to real-time communications services such as VoLTE (Voice over Long Term Evolutional) defined to run on an IMS network. In general terms, available network resources in any network, but especially parts of a network that uses radio access as the physical layer like an IMS network, may show major and (as seen from the network user) unpredictable variations. Examples of such network resources include, but are not limited to, available capacity (expressed in bitrate), the ability to forward all data (expressed as packet loss), and transmission delay. The resources are typically not independent, but may be inter-related. Some reasons for this inter-relation may come from physics and laws of nature, but are also typically impacted by the total end-to-end network topology and design.

To achieve acceptable Quality of Experience (QoE) for a real-time communication service such as VoLTE, it may be necessary to put requirements on both the availability of (from network) and use of (by client) multiple network resources, such as the network resources described above. The resource inter-relations typically imply that it may not be possible to improve (availability or use of) one resource without worsening (availability or use of) one or more of the other resources. The enclosed embodiments may thus be regarded as relating to a joint optimization problem, targeting to maximize QoE at all times. This problem may include to consider the complexity and variability of a typical network and that the exact resource inter-relations not being known, as well as problems to even know the metrics, the exact resource values like available bitrate, at any point in time.

This joint QoE optimization may be regarded as comprising closely and dynamically matching resource demand and resource availability. When demand exceeds availability for one resource, it will potentially impact also other inter-related resources. Similarly, when availability exceeds demand of one resource, the surplus capacity could potentially have been better spent improving other inter-related resources instead.

The enclosed embodiments may be regarded as focusing on improving the match between demand and availability of bitrate resources as a mechanism to limit impact on the inter-related loss and delay characteristics.

The embodiments disclosed herein thus relate to handling network characteristics. In order to obtain handling of network characteristics there is provided a network information system, a method performed by the network information system, a computer program comprising code, for example in the form of a computer program product, that when run on a network information system, causes the network information system to perform the method.

Figure 2A:
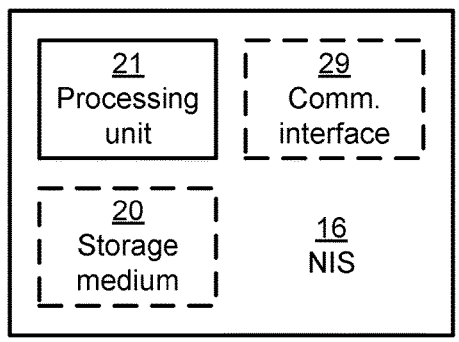
FIG. 2a is a schematic diagram showing functional modules of a network information system according to embodiments.

FIG. 2a schematically illustrates, in terms of a number of functional modules, the components of a network information system (NIS) 16 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 3), e.g. in the form of a storage medium 20. Thus the processing unit 21 is thereby arranged to execute methods as herein disclosed. The storage medium 20 may also comprise persistent storage, which, for example, can be any single one or combination of magnetic memory, optical memory, solid state memory or even remotely mounted memory. The NIS 16 may further comprise a communications interface 29 for receiving and providing information to other modules and devices in the communications network 11a, 11b. The processing unit 21 controls the general operation of the NIS 16, e.g. by sending data and instructions to the storage medium 20, retrieving data and instructions from the storage medium 20, sending control signals to the communications interface 29, and receiving reports from the transmitter communications interface 29 of its operation.

Other components, as well as the related functionality, of the NIS 16 are omitted in order not to obscure the concepts presented herein. The NIS 16 may be provided as a stand-alone device or as a part of a further device.

Figure 2B:
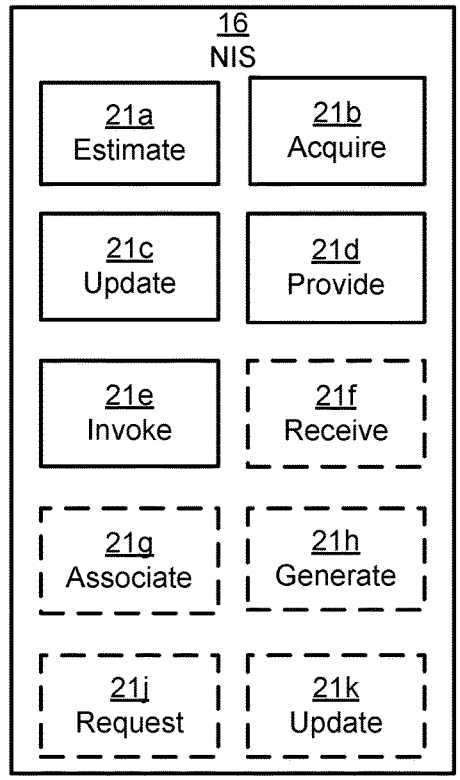
FIG. 2b is a schematic diagram showing functional units of a network information system according to embodiments.

FIG. 2b schematically illustrates, in terms of a number of functional units, the components of a NIS 16 according to an embodiment. The NIS 16 of FIG. 2b comprises a number of functional units; an estimate unit 21a, an acquire unit 21b, an update unit 21c, a provide unit 21d, and an invoke unit 21e. The NIS 16 of FIG. 2b may further comprises a number of optional functional units, such as any of a receive unit 21f, an associate unit 21g, a generate unit 21h, a request unit 21j and an update unit 21k. The functionality of each functional unit 21a-k will be further disclosed below in the context of which the functional units may be used. In general terms, each functional unit 21a-k may be implemented in hardware or in software. The processing unit 21 may thus be arranged to from the storage medium 20 fetch instructions as provided by a functional unit 21a-k and to execute these instructions, thereby performing any steps as will be disclosed hereinafter.

Figure 2C:
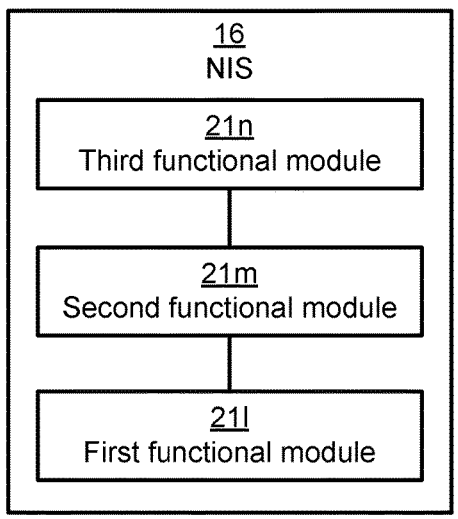
FIG. 2c is a schematic diagram showing functional modules of a network information system according to embodiments.

FIG. 2c schematically illustrates, in terms of a number of functional modules, the components of a NIS 16 according to an embodiment. The NIS 16 of FIG. 2b comprises a first functional module 21l, a second functional module 21m, and a third functional module 21n. The second functional module 21n is operatively connected to the first functional module 21l and the third functional module 21n. According to embodiments, the first functional module 21l is a bitrate estimator (BE) module. According to embodiments, the second functional module 21m is a bitrate orchestrator (BO) module. According to embodiments, the third functional module 21n is a bitrate control application server (BCAS) module. According to embodiments, the third functional module 21n is a policy control resource function (PCRF) module.

Figure 3:
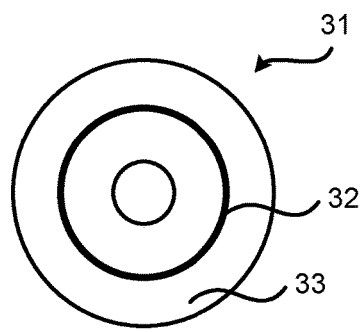
FIG. 3 shows one example of a computer program product comprising computer readable means according to an embodiment.
Figure 5:
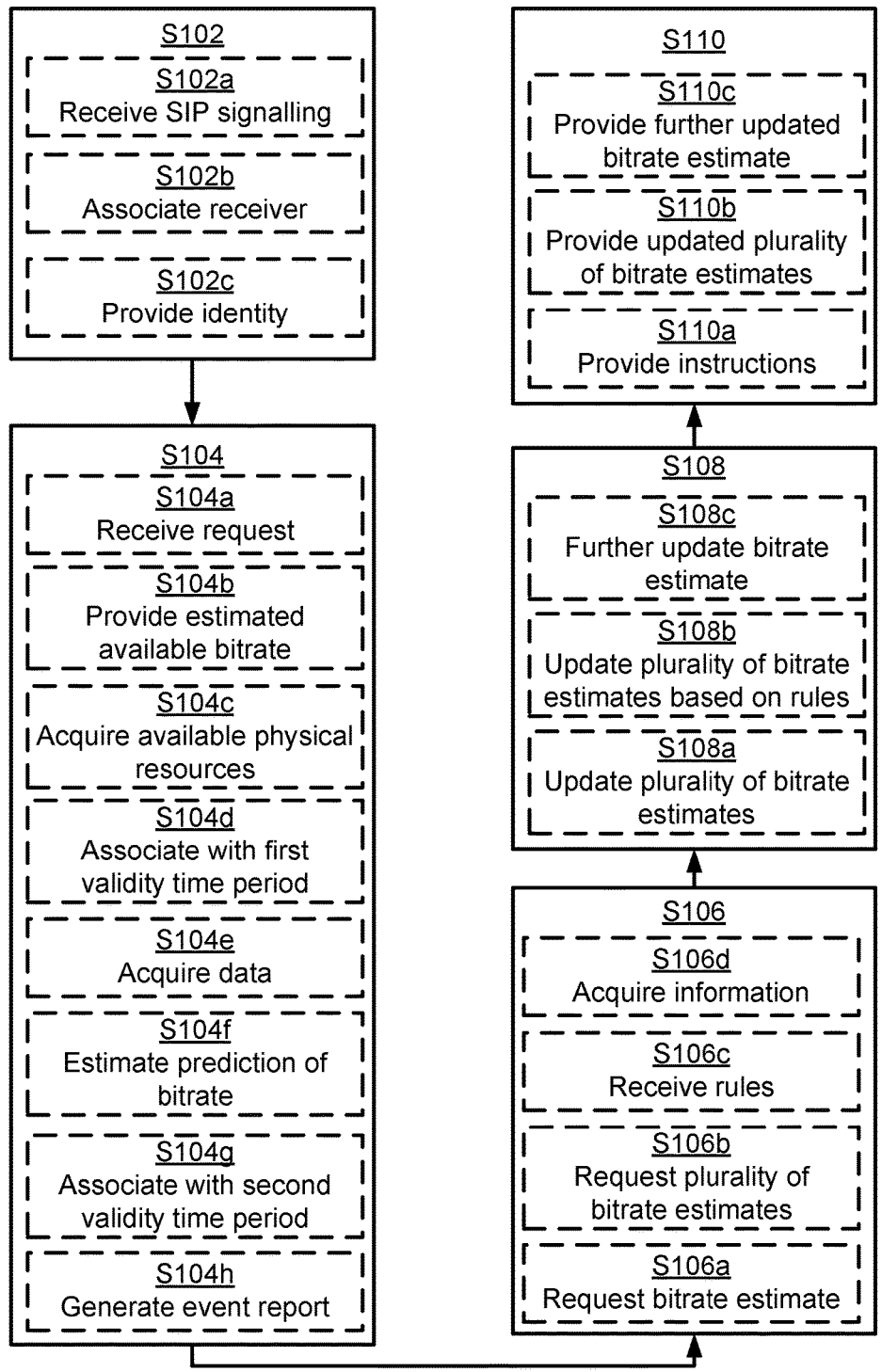

FIGS. 5 and 6 are flow charts illustrating embodiments of methods for handling network characteristics. The methods are performed by the NIS 16. The methods are advantageously provided as computer programs. FIG. 3 shows one example of a computer program product 31 comprising computer readable means 33. On this computer readable means 33, a computer program 32 can be stored, which computer program 32 can cause the processing unit 21 and thereto operatively coupled entities and devices, such as the storage medium 20, and/or the communications interface 29 to execute methods according to embodiments described herein. The computer program 32 and/or computer program product 31 may thus provide means for performing any steps as herein disclosed.

In the example of FIG. 3, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 32 is here schematically shown as a track on the depicted optical disk, the computer program 32 can be stored in any way which is suitable for the computer program product 31.

Figure 4:
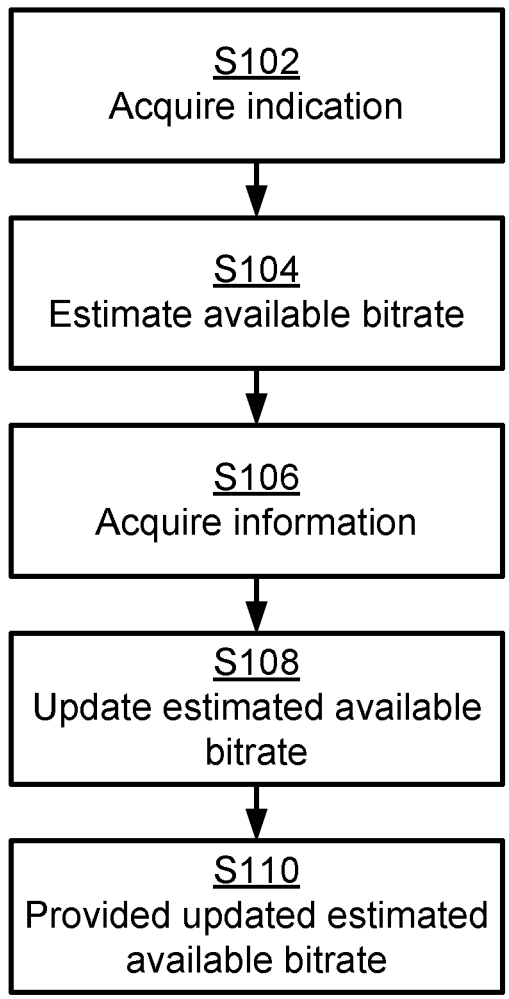
FIGS. 4 and 5 are flowcharts of methods according to embodiments.

Reference is now made to the flowchart of FIG. 4 disclosing a method for handling network characteristics according to an embodiment.

In general terms, more accurate knowledge about actual network characteristics for some localized part of the communication network 11a, 11b at a given point in time may be available in network nodes. Such information may be managed by a Network Information System (NIS) 16.

The NIS 16 comprises a first functional module 21*l*. The first functional module is arranged to estimate an available bitrate for a media flow. The processing unit 21 of the NIS 16 is thus arranged to, in a step S104, estimate this bitrate. The available bitrate is estimated based on available physical resources of a network node for the transmission of the media flow.

The NIS 16 comprises a second functional module 21*m*. The second functional module is arranged to acquire information about a permitted share of physical resources to be used during the transmission of the media flow. The processing unit 21 of the NIS 16 is thus arranged to, in a step S106, acquire this information.

The second functional module is arranged to update the estimated available bitrate for the media flow by matching the information to the estimated available bitrate for the media flow. The processing unit 21 of the NIS 16 is thus arranged to, in a step S108, update this estimated available bitrate.

The second functional module is arranged to provide the updated estimated available bitrate to a network entity associated with transmission of the media flow. The processing unit 21 of the NIS 16 is thus arranged to, in a step S110, provide this bitrate to the network entity.

The NIS 16 comprises a third functional module 21*n*. The third functional module 21*n* is arranged to invoke handling of network characteristics by triggering operation of the first functional module 21*l* and the second functional module 21*m*. The processing unit 21 of the NIS 16 is thus arranged to, in a step S102, acquire an indication to invoke handling of network characteristics. The processing unit 21 is arranged to, upon acquiring this indication, trigger operation of the first functional module 21*l* and the second functional module 21*m*.

Examples of network characteristics include, but are not limited to, available transport bitrate, transport loss rate, transport delay, transport delay jitter.

The first functional module may interface a network node, and the second functional module. The second functional module may interface a network node, a session border gateway (SBG), the first functional module, and the third functional module. The third functional module may interface a home subscriber server (HSS) a serving call signalling control function (S-CSCF), and the second functional module.

The first functional module may be a bitrate estimator (BE) module. The second functional module may be a bitrate orchestrator (BO) module. The third functional module may be a Bitrate Control Application Server (BCAS) module. Alternatively the third functional module may be a policy control resource function (PCRF) module. The network entity may be at least one of a user equipment 12*a*, 12*b* transmitting the media flow, and a network node 13 forwarding the media flow.

At least one of the first functional module, the second functional module, and the third functional module may be implemented in a voice over long term evolution (VoLTE) Internet protocol multimedia subsystem (IMS) media resource function processor (MRFP). Hence the NIS 16 may be regarded as a further feature to VoLTE and the IMS media and signaling plane.

Reference is now made to the flowchart of FIG. 5 disclosing methods for handling network characteristics according to embodiments. Embodiments relating to operations of the BE (e.g., as performed by the first functional module 21*l*), the BO (e.g., as performed by the second functional module 21*m*), and the BCAS (e.g., as performed by the third functional module 21*n*), will now be disclosed in turn.

The first functional module may be arranged to, in an optional step S104*a*, receive a request for a bitrate estimate for transmission of the media flow and an intended recipient of the request. The first functional module may then be arranged to, in an optional step S104*b*, provide the estimated available bitrate to the intended recipient of the request for the bitrate estimate.

There may be different ways to acquire the available physical resources. The first functional module may be arranged to, in an optional step S104*c*, acquire the available physical resources from the network node.

A bitrate estimator (BE) module may thus be configured for estimating available bitrate and may have sufficient information to also provide a validity time period for that available bitrate. Hence, the first functional module may be arranged to, in an optional step S104*d*, associate the estimated available bitrate with a first validity time period.

The BE module may also be configured for providing a forecast of values for some future time period, and also for providing the length of that time period. Hence, the first functional module may be arranged to, in an optional step S104*e*, acquire link layer trend data and network history data; and in an optional step S104*f*, estimate a prediction of the available bitrate for the media flow based on the estimated available bitrate for the media flow and the acquired link layer trend data and network history data. The first functional module may be arranged to, in an optional step S104*g*, associate the estimated prediction of the available bitrate with a second validity time period.

The intended recipient of the request may be a user equipment (UE) 12*a*, 12*b* from which the transmission of the media flow originates. The available bitrate may thus be timely provided to a media sender, such as an UE, controlling the produced bitrate. This may enable the media sender to more precisely adjust the sent bitrate to what is actually available, the media sender thereby being able to dynamically optimize both resource usage and perceived quality. The available bitrate for a specific media sender may be based on, and capped by, physically available resources at any given point in time. Alternatively, and as will be further disclosed below, the intended recipient of the request may be the second functional module.

The first functional module may be arranged, during transmission of the media flow, to in an optional step S104*h*, generate an event report based on a triggering condition. The event report comprises information on what event that has been triggered and any available estimated available bitrate for the media flow and prediction of the available bitrate for the media flow. The steps performed by the first functional module may be repeated while a subscription to the NIS 16 for providing updated estimated available bitrate to a network entity associated with transmission of the media flow is active.

A BO module may be configured for filtering the available bitrate information provided by the BE module, also taking other aspects and information sources than physical resources into account. The BO module may thereby be able to intelligently orchestrate available bitrate resources. Such orchestration may not have inherent means to enforce the media senders to follow the orchestrated bitrate, but may be complemented by interconnection to traffic shaping and/or policing functionality that may already be part of the network.

The BO module may inform the BE module to send bitrate estimates to the BO module. The second functional module may thus be arranged to, in an optional step S106a, request the first functional module to provide the bitrate estimate for transmission of the media flow.

The BO module may enable enforcement, thereby enabling adjustment of overall resource usage. The second functional module may thus be arranged to, in an optional step S110a, provide instructions to networks nodes handling transmission of the media flows to adjust their bitrate for transmission of the media flows according to the updated estimated available bitrate. The second functional module alternatively be arranged to, provide information to a policy and shaping network entity so that the policy and shaping network entity may perform the adjustment of the network nodes.

The BO module may match a plurality of bitrates and forward these. The second functional module may thus be arranged to, in an optional step S106b, request the first functional module to provide a plurality of bitrate estimates for transmission of a plurality of media flows. The second functional module may then be arranged to, in an optional step S108a, update the plurality of estimated available bitrates for the plurality of media flows by matching the information to the estimated available bitrate for each one of the plurality of media flows. The second functional module may then be arranged to, in an optional step Snob, provide the plurality of updated estimated available bitrates to network entities associated with transmission of the media flow. The plurality of media flows may share a common physical transmission resource.

Information sources for the orchestration may optionally include history data as stored in a database. The database may be indexed with any information that is found to provide an improved precision in the available bitrate information. History data may also aid generating the forecast mentioned above. The statistical significance of actual physical resource information and history data may be considered and dynamically weighted into the resulting available bitrate.

Another information source for the BO may be any set of rules on how to divide resources shared between UEs. These additional restrictions may include a definition of how to share resources (such as a policy), for example to what extent sharing is to be fair, including a contextual definition of what is fair. The source of this policy information in a VoLTE system may be the PCRF, optionally amended with per-user data from the subscriber database in the HSS.

There may be different rules of how to divide shared resources. The second functional module may be arranged to, in an optional step S106c, receive rules describing how to share physical resources from a policy control resource function (PCRF) module. The second functional module may then be arranged to, in an optional step S108b, update the plurality of estimated available bitrates for the plurality of media flows based also on the received rules.

The steps performed by the second functional module may be repeated while a subscription to the NIS 16 for providing updated estimated available bitrate to a network entity associated with transmission of the media flow is active. The second functional module may be arranged during transmission of the media flow to, in an optional step S106d, acquire information about physical resources used during the transmission of the media flow. The second functional module may then be arranged to, in an optional step S108c, further update the updated estimated available bitrate for the media flow by matching the information about physical resources used during the transmission of the media flow to the updated estimated available bitrate for the media flow. The second functional module may then be arranged to, in an optional step S110c, provide the further updated estimated available bitrate to the network entity.

Invocation of the BE module and the BO module may be triggered by the BCAS module. Invocation may follow procedures in existing IMS specifications on how to make use of multiple application servers (AS). The actual signaling of the available bitrate may not use this signaling channel since it may be considered inappropriate, and instead may use either existing or new signaling means, or a combination thereof. Hence the third functional module may be arranged to, in an optional step S102a, receiving session initiation protocol (SIP) signalling. The SIP signalling comprises an indication to invoke the third functional module. The third functional module may be arranged to, in an optional step S102b, associate at least one receiver with the estimated available bitrate or the updated estimated available bitrate based on the indication; and in an optional step S102c, provide an identity of the at least one receiver to the second functional module.

BE Module

Further embodiments relating to the BE module will now be disclosed. In FIG. 1b as referenced above, the eNB provides actual available bitrate information to the BE module and the information is further refined by the BO module. This interface between the BE module and the BO module can be implemented in various ways; for example polled, time-triggered (periodic) callback, or setup as an event subscription that will generate a callback whenever the available bitrate fulfills some conditions. Examples of such conditions may be a reduction or an increase in available bitrate by a certain percentage, the available bitrate reaching a certain upper or lower threshold, where the percentage and threshold values can be different depending on if they reflect reduction or increase. Such conditions may for example either be pre-determined or may be established at the time of event subscription.

An embodiment where the BE module performs a number of steps will now be disclosed in more detail. These steps may be combined with any steps as performed by the BO module and/or the BCAS module.

Step BE1: The BE module receives information that bitrate estimation is to be performed for a given set of media flows in an (upcoming or existing) communication session. Identification of those flows is made based on information from SIP/SDP call setup such as a transport 5-tuple (IP address and UDP port for the source, IP address and UDP port for the destination, and transport flow protocol identifier) combined with a RTP SSRC identifier.

Step BE2: The BE module receives information on what entity is the receiver of bitrate estimates.

Step BE3: The BE module receives subscription information about bitrate minimum and maximum limits and other event reporting conditions per media flow, such as rate of, or magnitude of, bitrate change since any last event report.

Step BE4: The BE module retrieves a current start bitrate estimate from eNB physical and link layer information.

Step BE5: The BE module uses current eNB and link layer trend and history data to create a bitrate prediction for the close future.

Step BE6: The BE module sends this start bitrate estimate and prediction (preferably includes the prediction time validity), to the receiver designated in step BE2.

Step BE7: The BE module as long as the subscription is active (not being unsubscribed by the subscribing party): retrieves eNB physical and link layer information; calculates available bitrate and prediction for the close future from trend and history data; compares available bitrate with received threshold and reporting conditions, which could include comparison with previously reported values; and if any reporting condition is met, generates a reporting event including information on what event that triggered and the available bitrate estimate and prediction, and forwards the event to the designated receiver from step BE2, and saves reported values for future comparisons.

Step BE6: The BE module during the above step BE7, when receiving information that all media flows related to a specific bitrate event subscription are removed (such as when the communication session ends), terminates the event subscription and informs the subscribing party.

BO Module

Further embodiments relating to the BO module will now be disclosed. In general terms, the orchestration functionality included in the BO module allows dynamic allocation of bitrate resources to all clients sharing the same physical resource. For example, a client entering a network area (for example an LTE cell) that is nearly fully loaded and wants more bitrate resources than what is currently unused need not necessarily be rejected to enter or be given only the remaining bitrate resources, but may take advantage of the orchestration causing all remaining clients in the network area to reduce their usage as long as the resulting distribution is still considered fair (or conforming to whatever policy is defined).

In the resulting set of restrictions comprising the policy some restrictions may be unique per client, and some may be identical for a set of clients (for example the clients used for a specific service, such as VoLTE, or clients used by some specific category of subscribers, such as for example user identified as premium users) or even shared, and thus identical, between all clients. At least some of the rules may not be pre-configured in the clients and may thus instead be centrally administrated within the network. As such, they may be applied and communicated as affecting available bitrate in the dynamic fashion described above.

An embodiment where the BO module performs a number of steps will now be disclosed in more detail. These steps may be combined with any steps as performed by the BE module and/or the BCAS module.

Step BO1: The BO module receives information that bitrate orchestration is to be performed for a given set of media flows in an (upcoming or existing) communication session. Identification methods for media flows are the same or similar as described for the BE module above. This information request can be of two types, indicative or authoritative.

Step BO2: The BO module receives information on receiver(s) of orchestrated bitrate estimates for this communication session.

Step BO3: The BO module informs the BE module that it is the receiver of bitrate estimates for this communication session (corresponds to step BE2 above).

Step BO4: The BO module keeps an internal database of current jointly orchestrated communication sessions, including, but not limited to:

Which media flows that share physical resources.

Each communication session's receiver of bitrate estimates, from Step BO2 above.

Each communication session's media flows. Each communication session may in general have multiple media flows and thus make use of several different, sharable physical resources.

Each communication session's permitted share of physical resources, relative to other communication sessions, in terms of both absolute and relative target, minimum and maximum thresholds. Such combination may for example be expressed as "5% of available resources for all communication sessions sharing those resources but at least 50 kbps and at most 1000 kbps". This information may optionally be detailed per media flow in the communication session.

Each media flow's currently allocated utilization of its shared physical resources.

Step BO5: The BO module receives information about this communication session's permitted share of physical resources (as described above) and updates the database in step BO4 accordingly.

Step BO6: The BO module retrieves a start bitrate estimate from the BE module.

Step BO7: The BO module matches the start bitrate estimate from step BO6 against information from step BO5 and information for other ongoing communication sessions from the database in step BO4.

Step BO8: The BO module, if the request from step BO1 is indicative and thus not related to an upcoming or ongoing communication session, forwards the bitrate estimate from step BO7 to the receiver from step BO2 and does not proceed with any of steps BO9-BO15 below.

Step BO9: The BO module, if the request from step BO1 is authoritative, adjusts (orchestrates) the overall resource usage across all ongoing communication sessions and media flows, resulting in an updated set of bitrates for a set of communication sessions, not only the one from step BO6.

Step BO10: The BO module updates the database of step BO4 with values from step BO7.

Step BO11: The BO module forwards updated bitrate estimates to all affected communication sessions in step BO7, with receivers specified in step BO2. The communication session from step BO6 is given the start value since it had no previous value and is thus considered already to be updated.

Step BO12: The BO module determines a suitable set of subscription event conditions based on the permitted share from step BO5.

Step BO13: The BO module generates a subscription of bitrate events based on information from Step BO12.

Step BO14: The BO module, as long as the communication session is active: receives events with bitrate estimates and predictions (with time validity) for close future, per subscribed media flow; performs operations from step BO7, but for received dynamic rather than start bitrate; updates the database of Step BO4 with values from Step BO14; forwards updated bitrate estimates to all affected communication sessions in Step BO14, with receivers as specified in Step BO2. The BO module may optionally inform policing and/or shaping entities, such as the MRFP and the SBG, on updated bitrate estimates to adjust policing and shaping functions, unless they are already receivers and thus informed according to the steps disclosed above.

Step BO15: The BO module unsubscribes from bitrate events for media flows when the communication session containing those flows ends.

BCAS Module

Further embodiments relating to the BCAS module will now be disclosed. Although already handling IMS policies, the PCRF may not be updated with this type of policy handling rules. This is however a possibility according to an alternative embodiment. However, according to the present embodiment this policy handling is performed by the BCAS module. In this case the BCAS module is in general operatively connected to one or multiple bitrate orchestration policy handlers providing information to the local UE via the BCAS module and the BO module. This handling may be further supported by information from the PCRF (which may have to be reconfigured, as well as the signaling between the PCRF and the S-CSCF) regarding UE service and/or subscription information, such as subscription category as mentioned above.

According to one embodiment the BCAS module A is interconnected to the BCAS module B (see, FIG. 1b), thereby making it possible to align policies and for example choose the policy applied to UE A based on rules mainly set by the BCAS module B, thereby overriding some or all existing rules in the BCAS module A, if that is a wanted outcome by both the BCAS module A and the BCAS module B. This would enable, for example, the user experience at UE B not being hampered by local UE A uplink policies, since UE B experience is affected by both the UE A uplink and the UE B downlink.

For such bitrate resource orchestration to work as intended, the herein disclosed NIS may rely on clients (UEs) that obey the given information. It may be assumed that the party developing and deploying such bitrate orchestration is not identical to the party or parties providing the clients (UEs), and the BO module may thus not fully control or trust the clients to comply. The BO module may thus be provided with means to handle non-compliant clients. These means may for example be traffic shaping and/or traffic policing actions, such as the ones already defined in 3GPP. Assuming that all clients want to avoid being policed, a client should be motivated to follow orchestration directions.

An embodiment where the BCAS module performs a number of steps will now be disclosed in more detail. These steps may be combined with any steps as performed by the BE module and/or the BO module.

Step BCAS1: The BCAS module receives SIP signaling with SDP, indicating that BCAS functionality is to be invoked for this session. This may be received in line with existing IMS AS invocation procedures. Note that several AS, or BCAS, may be invoked for a single communication session, based on information on AS and ordering in HSS.

Step BCAS2: The BCAS module invokes the BO module for the affected media flows from the received SDP (corresponds to Step BO1).

Step BCAS3: The BCAS module contacts the HSS through existing IMS interfaces (Sh) and retrieves subscriber information on the subscriber's permitted share of physical resources.

Step BCAS4: The BCAS module optionally contacts the remote party BCAS (if any) and aligns permitted shares between originating and terminating users in both directions.

Step BCAS5: The BCAS module chooses receiver(s) of orchestrated bitrate estimates based on the SDP from step BCAS1, HSS information from step BCAS3, and optionally remote party information from step BCAS4, and informs the BO module about this (corresponds to Step BO2). Examples of decision criteria may be whether or not an MRFP will be included in the communication session media path, in which case the MRFP may be chosen as receiver, if the subscriber and UE are trusted in which case the UE can be chosen as receiver, or if an SBG is included in the communication session media path in which case that may be the most suitable receiver. A non-limiting example of multiple receivers of bitrate orchestration is when policing and/or shaping functions are enabled and thus both those and the media sending party are set as receivers.

Step BCA6S: The BCAS module informs the BO module on permitted share of physical resources (corresponds to step BO5).

Step BCAS7: The BCAS module receives SIP signaling indicating that the communication session has ended, according to existing IMS procedures, and informs the BO module of this fact (corresponds to Step BO15).

Further embodiments relating to invocation will now be disclosed in turn.

Pre-Call Invocation

It is for illustrative purposes assumed that the user of UE A wishes to set up a call. UE A includes functionality to indicate to the user what type or types of multimedia calls (e.g. audio-only, audio-video, none, etc.) that is/are feasible at this point in time. This indication may be given to the user in different UE user interface contexts. A pre-call invocation is referred to as indicative in Step BO1 above.

How to contact (address) and authenticate to the BO module A directly may, for example, be pre-configured in UE A, or be configured via device management procedures, for example similar to Open Mobile Alliance-Device Management (OMA-DM). A protocol used may be HTTPS (Hypertext Transfer Protocol Secure) carrying an XML (Extensible Markup Language) scheme document, combined with HTTPS UE authentication.

An always-visible, available-call-type in UE A allows indication of possible call types based on locally available resources. This requires frequent information update, whenever the UE screen is viewed, and thus frequent contact with the BO module A. This may be too resource demanding, for example due to heavy load on the BO module A, or because of excessive signaling traffic.

As an alternative, when the user of UE A opens a call handling application, UE A may request the BO module A for available bitrate resources and receives a response that allows UE A to indicate possible call types based on locally available resources. At this point in time, when no remote party is chosen, remote resources cannot be known since it is not known what the remote network is.

When the user of UE A chooses a remote party, UE A can make a similar request to the remote BO module B, belonging to the terminating user at UE B. Finding the BO module B may be assisted by regular IMS paging procedures, for example by making a capability check through sending SIP OPTIONS to UE B that is routed via the BCAS module B (assuming that the terminating network also has a BCAS module, a BE module, and a BO module), which can have information allowing it to contact the local BO module B. When the remote available bitrate response is received, the user of UE A may be given indication which call types are currently available end-to-end from UE A to UE B.

If the user of UE A decides to make the call, the initial bitrate may be chosen based on the received end-to-end bitrate information.

If only local or only remote bitrate information is received, no end-to-end call type availability indication may be given to the user.

In-Call Invocation

The in-call invocation of the BO module may be motivated by changing channel characteristics during an ongoing call. Even for IMS quality of service channels, the quality may typically only be guaranteed to a certain percentage. An in-call invocation, including an invocation as part of a call setup procedure, is referred to as authoritative in step BO1.

There are two possible types of embodiments; the BO module could be operatively connected to the UE either directly or indirectly, using either new or existing signaling means. One benefit with re-using existing signaling is a reduced number of changes (or no changes at all) in the UE, and the current UE specification may also not have to be changed.

Direct connection between the UE and the BO module may be feasible if the UE supports any needed protocol and is trusted to use this direct information. An example of such protocol could be HTTPS carrying some XML scheme document, combined with suitable UE authentication procedures. One possible connection between the UE and BO module is subscription (or event) based; therefore one example is to setup HTTPS connection as persistent implementing event model responses.

Indirect connection means that the BO module is operatively connected to the UE via another network node that is already in the signaling or (signaling part of) media path, which may be assumed to always be trusted. A possible downside of this alternative is that such a network node may become a capacity limitation if there are many connections. For a VoLTE context, examples are a Media Resource Function (MRF) or a Session Border Gateway (SBG). In such cases, signaling of maximum available bandwidth to the UE can be mapped to the TMMBR message, already part of VoLTE, carried in the signaling part (RTCP) of the media path. The direct connection (as above) may then instead be set up between the BO module and the chosen network node (for example the MRF or the SBG).

There are potentially two BO modules (BO module A and BO module B) involved in a UE-to-UE call. The sending side of a UE should limit the transmitted bitrate to the minimum of the local and the remote side. In order to accomplish this the UE needs information on the uplink from a local BO module (BO module A for UE A) and information on the downlink from a remote BO module (BO module B for UE A). If either side lacks BO module functionality, the UE may combine BO module information with existing mechanisms (as described above).

It may be assumed unlikely that a UE has direct access to the remote BO module (BO module B for UE A and BO module A for UE B). In this case, an indirect connection may be used between the remote BO module and the local UE. This indirect connection may be made either via a network node or via the remote UE. For example, UE A may receive information from BO module B as TMMBR messages either via UE B, MRFP B or SBG B.

Further embodiments relating to resource change will now be disclosed in turn.

Local Resource Change

Assume, for illustrative purposes only, that UE A has an ongoing call with UE B. Further assume, for illustrative purposes only, that BO module A finds reason to adjust the orchestrated bitrate allocated to the UE A uplink. BO module A then sends this update information through the direct interface (for example as an HTTPS event) to the direct receiver, which may either be UE A directly or the chosen indirection network node (e.g., MRF, or SBG). In case of indirect connection, the network node performs signaling translation and forwards the information (for example as TMMBR messages) to UE A. UE A then adjusts the used uplink bitrate accordingly.

Remote Resource Change

Assume, for illustrative purposes only, that UE A has an ongoing call with UE B. Further assume, for illustrative purposes only, that BO module B finds reason to adjust the orchestrated bitrate allocated to the UE B downlink. BO module B then sends this update information through the direct interface (for example as an HTTPS event) to the direct receiver, which may either be UE B or the chosen indirection network node (e.g., MRF, or SBG). In any case, to reach the intended receiver UE A (and assuming that BO module B cannot directly reach any UE or network node in the A-part of the network), either one of the above performs signaling translation and forwards the information (for example as TMMBR messages) to UE A. UE A then adjusts the used uplink bitrate accordingly.

Further embodiments relating to policing will now be disclosed in turn.

When a UE does not sufficiently accurate or sufficiently fast (or not at all) follow bitrate reduction information sent by the BO module, policing functionality may be triggered. One example to accomplish this is via information given by the BO module to the SBG, for example when media streams are anchored in the SBG, or alternatively the MRF, when the MRF is in the media path. The BO module being configured for directly contacting other, separate, policing nodes is within an alternative embodiment.

Such policing may comprise performing various modifications to the media stream that should trigger any legacy UE to reduce the bitrate, for example adding delay and/or dropping packets to make the bitrate conformant.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A network information system, NIS, for handling network characteristics, the NIS comprising:
   a core network node comprising at least one processor coupled to at least one memory, the memory comprising:
   a first set of instructions that when executed by the at least one processor causes the at least one processor be operable to:
   estimate an available bitrate for a media flow, wherein the available bitrate is estimated based on available physical resources of a user equipment node to transmit the media flow;
   a second set of instructions that when executed by the at least one processor causes the at least one processor be operable to:
   acquire information about a permitted share of physical resources to be used during the transmission of the media flow;
   update the estimated available bitrate for the media flow by matching the information to the estimated available bitrate for the media flow;
   transmit the updated estimated available bitrate to the user equipment node that transmits the media flow;
   transmit an instruction to the user equipment node that transmits the media flow to adjust the bitrate for transmission of the media flow according to the updated estimated available bitrate; and
   a third set of instructions that when executed by the at least one processor causes the at least one processor be operable to:
   invoke handling of network characteristics by triggering execution of the first set of instructions and the second set of instructions by the at least one processor.

2. The network information system according to claim 1, wherein first set of instructions further comprise instructions that when executed by the at least one processor causes the at least one processor be operable to:
 receive a request for a bitrate estimate for transmission of the media flow from the user equipment node that transmits the media flow; and
 transmit the estimated available bitrate to the user equipment node that transmits the media flow.

3. The network information system according to claim 1, wherein first set of instructions further comprise instructions that when executed by the at least one processor causes the at least one processor be operable to:
 acquire the available physical resources from the user equipment node.

4. The network information system according to claim 1, wherein first set of instructions further comprise instructions that when executed by the at least one processor causes the at least one processor be operable to:
 associate the estimated available bitrate with a first validity time period.

5. The network information system according to claim 1, wherein first set of instructions further comprise instructions that when executed by the at least one processor causes the at least one processor be operable to:
 acquire link layer trend data and network history data; and
 estimate a prediction of the available bitrate for the media flow based on the estimated available bitrate for the media flow and the acquired link layer trend data and network history data.

6. The network information system according to claim 5, wherein first set of instructions further comprise instructions that when executed by the at least one processor causes the at least one processor be operable to:
 associate the estimated prediction of the available bitrate with a second validity time period.

7. The network information system according to claim 1, wherein first set of instructions further comprise instructions that when executed by the at least one processor causes the at least one processor be operable, during transmission of the media flow, to:
 generate an event report based on a triggering condition, the event report comprising information on what event that has been triggered and any available estimated available bitrate for the media flow and estimated prediction of the available bitrate for the media flow.

8. The network information system according to claim 1, wherein the at least one processor interfaces the user equipment node.

9. The network information system according to claim 1, wherein the at least one processor comprises a bitrate estimator, BE.

10. The network information system according to claim 1, wherein the second set of instructions further comprise instructions that when executed by the at least one processor causes the at least one processor be operable to:
 obtain the bitrate estimate for transmission of the media flow from the first set of instructions.

11. The network information system according to claim 1, wherein the second set of instructions further comprise instructions that when executed by the at least one processor causes the at least one processor be operable to:
 obtain a plurality of bitrate estimates for transmission of a plurality of media flows from the first set of instructions;
 update the plurality of estimated available bitrates for the plurality of media flows by matching the information to the estimated available bitrate for each one of the plurality of media flows; and
 transmit the plurality of updated estimated available bitrates to user equipment nodes that transmit the plurality of media flows.

12. The network information system according to claim 11, wherein the plurality of media flows share a common physical transmission resource.

13. The network information system according to claim 1, wherein the second set of instructions further comprise instructions that when executed by the at least one processor causes the at least one processor be operable to:
 obtain rules describing how to share physical resources from a policy control resource function, PCRF, of the third set of instructions; and
 update the plurality of estimated available bitrates for the plurality of media flows based also on the received rules.

14. The network information system according to claim 1, wherein the second set of instructions further comprise instructions that when executed by the at least one processor causes the at least one processor be operable, during transmission of the media flow, to:
 acquire information about physical resources used during the transmission of the media flow;
 further update the updated estimated available bitrate for the media flow by matching the information about physical resources used during the transmission of the media flow to the updated estimated available bitrate for the media flow; and
 transmit the further updated estimated available bitrate to the user equipment node.

15. The network information system according to claim 1, wherein the at least one processor interfaces the user equipment node and a session border gateway, SBG.

16. The network information system according to claim 1, wherein the at least one processor comprises a bitrate orchestrator, BO.

17. The network information system according to claim 1, wherein the third set of instructions further comprise instructions that when executed by the at least one processor causes the at least one processor be operable to:
 receive session initiation protocol, SIP, signaling, the SIP signaling comprising an indication to invoke the third set of instructions;
 associate at least one receiver with the estimated available bitrate or the updated estimated available bitrate based on the indication; and
 provide an identity of the at least one receiver to the second set of instructions.

18. The network information system according to claim 1, wherein the at least one processor interfaces a home subscriber server, HSS, and a serving call signaling control function, S-CSCF.

19. The network information system according to claim 1, wherein the at least one processor comprises a bitrate control application server, BCAS.

20. The network information system according to claim 1, wherein the at least one processor comprises a policy control resource function, PCRF.

21. The network information system according to claim 1, wherein the at least one processor comprises a voice over long term evolution Internet protocol multimedia subsystem media resource function processor, VoLTE IMS MRFP.

22. A method for handling network characteristics, the method being performed by a core network node of a network information system, NIS, comprising the steps of:

acquiring an indication to invoke handling of network characteristics;

estimating an available bitrate for a media flow, wherein the available bitrate is estimated based on available physical resources of a user equipment node that transmits the media flow;

acquiring information about a permitted share of physical resources to be used during the transmission of the media flow;

updating the estimated available bitrate for the media flow by matching the information to the estimated available bitrate for the media flow;

transmitting the updated estimated available bitrate to the user equipment node that transmits the media flow; and transmitting an instruction to the user equipment node that transmits the media flow to adjust the bitrate for transmission of the media flow according to the updated estimated available bitrate.

23. A computer program product comprising a non-transitory computer readable storage medium storing computer program code which, when run on at least one processor of a core network node of a network information system, NIS, causes the NIS to:

acquire, at the core network node, an indication to invoke handling of network characteristics;

estimate, at the core network node, an available bitrate for a media flow, wherein the available bitrate is estimated based on available physical resources of a user equipment node that transmits the media flow;

acquire, at the core network node, information about a permitted share of physical resources to be used during the transmission of the media flow;

update, at the core network node, the estimated available bitrate for the media flow by matching the information to the estimated available bitrate for the media flow;

transmit, by the core network node, the updated estimated available bitrate to the user equipment node that transmits the media flow; and transmit, by the core network node, an instruction to the user equipment node that transmits the media flow to adjust the bitrate for transmission of the media flow according to the updated estimated available bitrate.

* * * * *